United States Patent Office 3,497,317
Patented Feb. 24, 1970

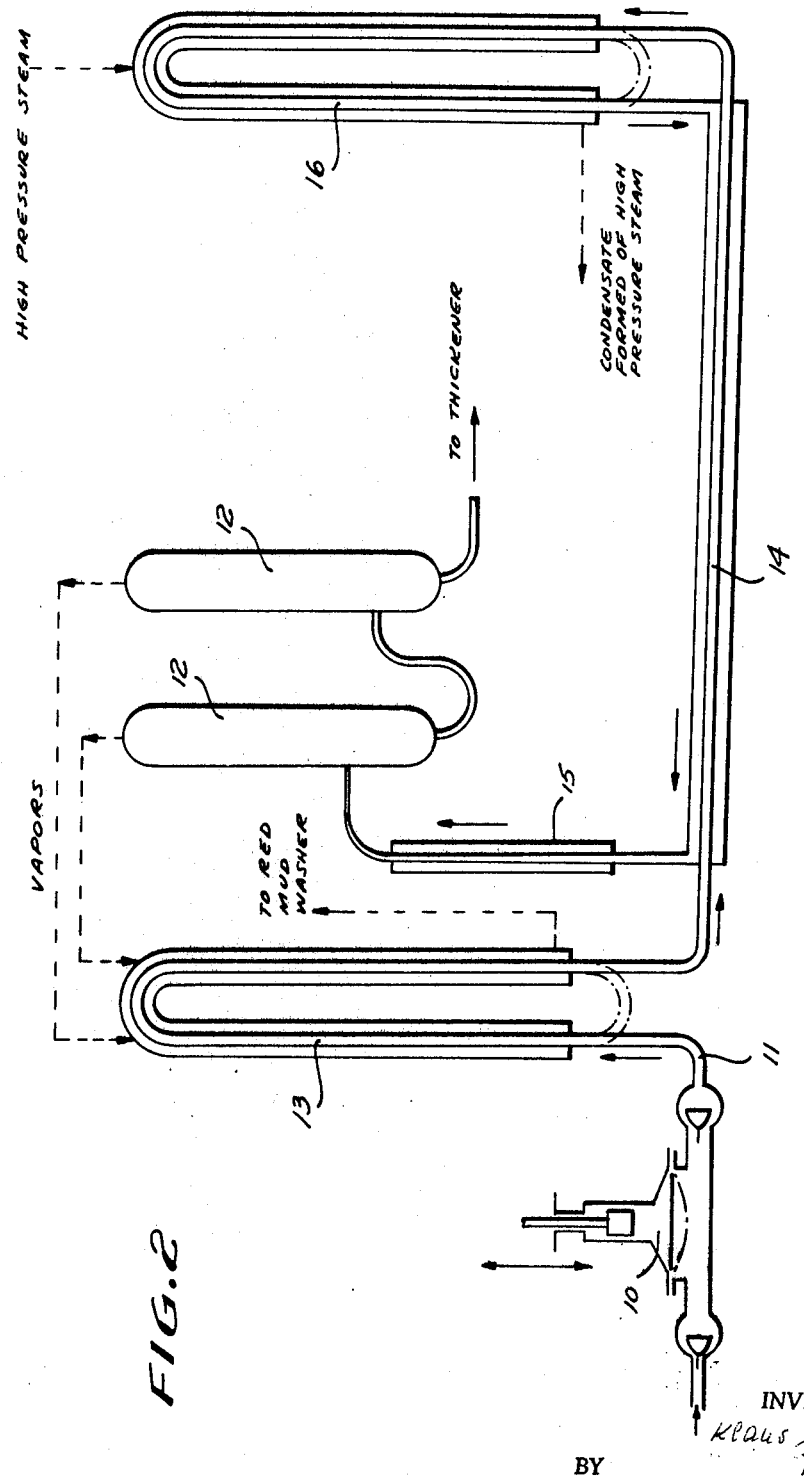

3,497,317
METHOD FOR CONTINUOUS EXTRACTION OF BAUXITE IN A TUBULAR REACTOR
Klaus Joachim Tusche, Lunen, Westphalia, Germany, assignor to Vereinigte Aluminium-Werke Aktiengesellschaft, Bonn, Germany
Filed Dec. 20, 1965, Ser. No. 515,517
Claims priority, application Germany, Dec. 22, 1964,
V 27,423
Int. Cl. C01f 7/38, 7/20
U.S. Cl. 23—143                     11 Claims

ABSTRACT OF THE DISCLOSURE

A method of recovering aluminum oxide from bauxite, comprising the steps of forming a suspension of bauxite in aluminate lye, passing the suspension at superatmospheric pressure through a heated reaction tube so as to dissolve the aluminum oxide of the bauxite in the aluminate lye and to form a hot suspension of the residual constituents of the bauxite in insoluble form. Then the hot suspension is cooled under recovery of heat and the aluminum oxide is recovered from the solute of the thus formed cooled suspension.

---

Figure 1:
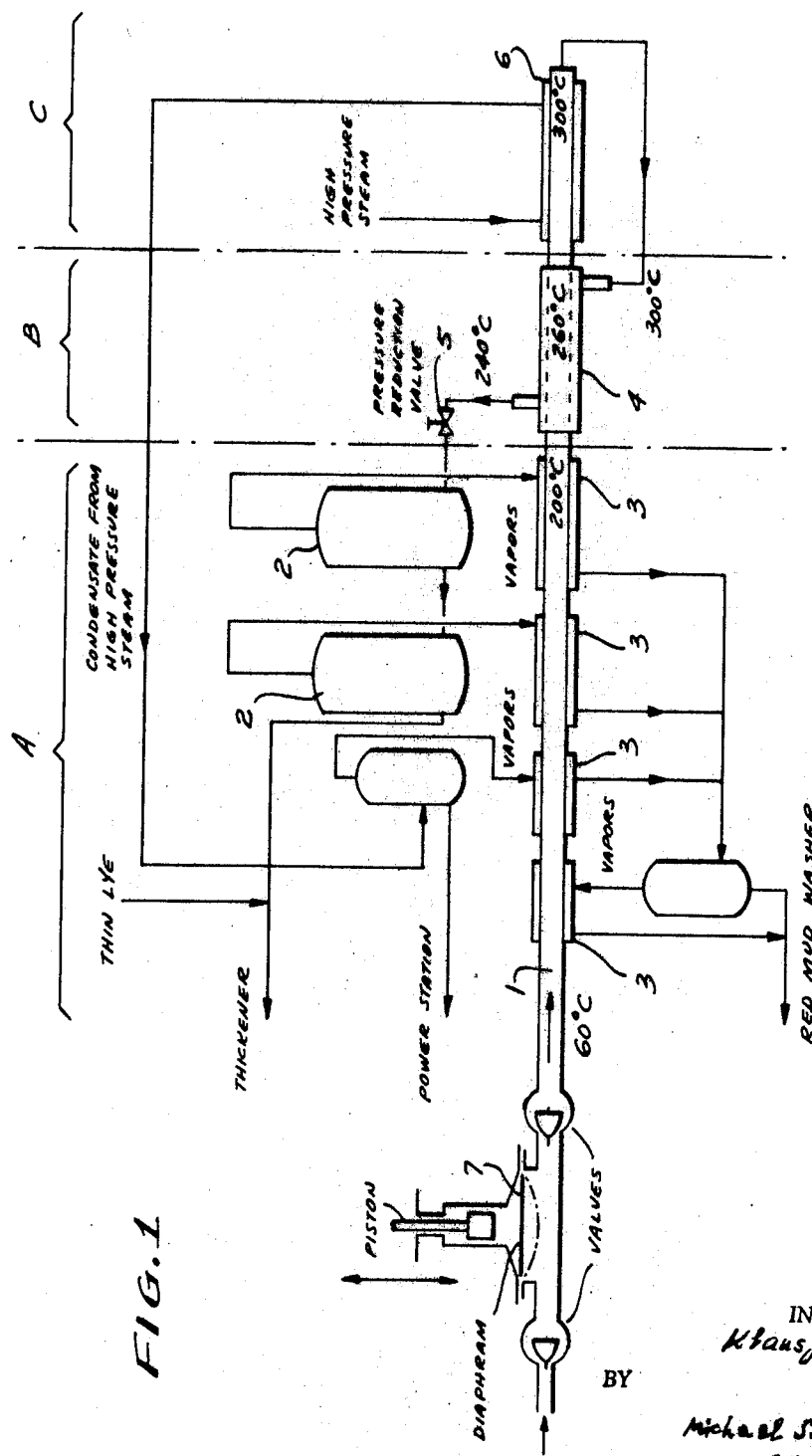

The present invention relates to a method and apparatus for the continuous extraction of bauxite and, more particularly, the present invention is concerned with a method and apparatus for the continuous extraction of bauxite with sodium aluminate lye for the recovery of aluminum oxide from the thus decomposed bauxite.

It has been proposed to obtain aluminum oxide from bauxite by treating the latter with aluminate lye at elevated temperatures and pressures. For instance, it has been proposed to treat bauxite with an aluminate-containing sodium hydroxide solution of between about 20 and 22° Bé. at temperatures higher than 190° C. and a corresponding working pressure of about 10 atmospheres or higher. The thus formed solution is then separated from solid particles suspended therein by conventional filtration and from the thus filtered solution, the aluminum oxide is separated under stirring while the remaining lye without being concentrated is reused for extracting subsequent portions of bauxite. It has also been attempted to carry out this method in a continuous manner by forming the autoclave in which the decomposition and extraction of the bauxite takes place as a heating coil and by continually moving the bauxite-lye mixture by means of a high pressure pump. Thereby, the heat contained in the mass of decomposed bauxite and aluminate lye is to be used for preheating of the starting mixture, and the red mud may be separated from the aluminum oxide solution, for instance, by a continuously operating filter. The clear solution of aluminum oxide which is thus obtained is then further treated by stirring in a conventional manner.

However, up to now, apparently unsurmountable technical difficulties prevented the carrying out of such continuous process.

It had been calculated that the reaction tube in which the decomposition and extraction of the bauxite was to take place had to be of extraordinary length in order to assure a residence time of the reaction mixture in the reaction tube which would correspond to that of the conventional autoclave decomposition and extraction of bauxite. For instance, it was calculated that the reaction tube would have to have a length of between about 13 and 15 km.

Furthermore, it was to be expected that incrustations would be formed at the inner face of the reaction tube and, after a limited period of operation, would seriously impede or even terminate the flow of reaction mixture through the reaction tube.

Furthermore, it was to be expected that such incrustations would greatly reduce the heat transfer through the wall of the reaction tube so that conveying the required heat from the outside through the wall of the reaction tube to the reaction mixture would take considerable time, and thus the portion of the reaction tube in which the material is to be heated up would have to be extraordinarily long.

The length of the reaction tube, in combination with the roughness of the inner surface thereof, which is increased by incrustations forming thereon, would cause build-up of very considerable mechanical resistance within the reaction tube against the flow of the reaction mixture therethrough so that pumps operating at extremely high pressure would be required for forcing passage of the reaction mixture through the reaction tube.

In addition to the dynamic pressure difference which thus would have to be overcome, it would also be necessary to provide the pressure which corresponds to the decomposition temperature. The general trend in the field of modifying and improving the Bayer process for producing aluminum oxide from bauxite tends to increase the decomposition temperature from the presently utilized 180–240° C. to higher temperatures, for instance 300° C. or even more. By such increase of the reaction temperature it is possible, even when working up European bauxites, to apply relatively thin alkali lyes and thus to reduce the amount of evaporation which is required according to the Bayer method prior to reusing the aluminate lye from which aluminum oxide has been separated. All in all, pressures of more than 200 atmospheres are envisaged. Up to now it was practically impossible to pump the strongly abrasive and corrosive sodium aluminate lyes against such high pressures.

Furthermore, another difficulty connected with the continuous decomposition of bauxite in a reaction tube had not been solved, namely to find an economic manner to reduce the pressure of the suspension which, as pointed out above, is to be built up during the reaction up to pressures of possibly higher than 200 atmospheres. It was to be expected that pressure reducing valves and nozzles would be subjected to very great wear and tear so that a reliable and uniform operation of such a reaction tube arrangement appeared impossible.

It is therefore an object of the present invention to overcome the above discussed difficulties and disadvantages.

It is another object of the present invention to provide a method and apparatus for the continuous decomposition of bauxite suspended in aluminate lye for the eventual recovery of aluminum oxide, which method can be carried out in a relatively simple and economical manner, and requires an apparatus of relatively small volume and thus economically to produce.

It is yet another object of the present invention to provide a method which will permit reduction of the reaction time required for the decomposition of the bauxite and which, in conjunction with the apparatus of the present invention, will provide for a highly effective heat transfer to and from the reaction mixture.

Other objects and advantages of the present invention will become apparent from a further reading of the description and of the appended claims.

With the above and other objects in view, the present invention contemplates a method of recovering aluminum oxide from bauxite, comprising the steps of forming a suspension of bauxite in aluminate lye, passing the suspension at super-atmospheric pressure through a heated reaction tube so as to heat the suspension during passage through the reaction tube in successive heating steps to a temperature sufficiently high to substantially dissolve the aluminum oxide of the bauxite in the aluminate lye thereby forming under pressure a hot suspension of residual constituents of the bauxite in insoluble form, the superatmospheric pressure being sufficiently high to prevent steam bubble formation in the hot suspension, cooling the hot suspension under recovery of heat therefrom, utilizing the thus recovered heat for providing the heat for the first ones of the successive heating steps, and recovering aluminum oxide from the solute of the thus formed cooled suspension.

The present invention also provides in an arrangement for the continuous recovery of aluminum oxide from a suspension of bauxite in aluminate lye, in combination, an elongated reaction tube, pump means for passing a suspension of bauxite in aluminate lye under pressure through the reaction tube, multistep indirect heating means associated with the reaction tube for stepwise indirect heating of the suspension during passage thereof under pressure through the reaction tube, pressure reducing means communicating with the outlet end of the reaction tube for reducing under formation of steam the pressure of the hot suspension leaving the reaction tube, first conduit means for conveying steam from the pressure reducing means to the multistep indirect heating means for indirect heating of the suspension during the first ones of the step wise heatings thereof, and second conduit means for conveying a heating fluid hotter than the steam to the indirect heating means for heating of the suspension during the last of the stepwise heatings thereof.

Thus, in the arrangement of the present invention, the high pressure pump preferably will be either a piston-diaphragm pump or a combination of a piston-diaphragm pump with a centrifugal pump. The entire pumping pressure required in accordance with the present invention is considerably lower than what had to be expected in accordance with prior suggestions for the continuous decomposition of bauxite.

Piston-diaphragm pumps, or the combination of a piston diaphragm pump and a centrifugal pump arranged in parallel, are capable of conveying a bauxite-aluminate lye suspension against pressures of about 150 atmospheres or even more. This piston-diaphragm and centrifugal pumps which may be used for this purpose are commercially available and known to those skilled in the art.

The reaction tube, in one portion thereof, preferably is arranged within a casing so that a heating fluid may pass through the casing in contact with the outer face of the reaction tube, whereby the portion of the reaction tube which is located within the casing should be arranged in such a manner that the length of the reaction tube portion is several times that of the casing, for instance by coiling or otherwise bending the reaction tube portion within the casing. A heating fluid is then passed through the casing, for instance live steam or vapors formed in a device in which the pressure of the heated solution of the suspension is reduced. Thus, the portion of the reaction tube located in the casing may be helically wound therein or formed with hairpin like bends, or the reaction tube may be arranged in a plurality of oval windings, the major portion of which is surrounded by a U-shaped casing.

After heating the reaction tube, and thus the reaction mixture flowing through the reaction tube, in the portion thereof which has been described above and which will be mentioned below for brevity's sake as the "coiled portion" of the reaction tube, the reaction tube and the contents thereof are preferably further heated in a coaxial noncommunicating, i.e., indirect, heat exchanger, for instance by surrounding a subsequent portion of the reaction tube with a coaxial jacket. Heating the reaction mixture in the jacketed portion of the reaction tube may be the penultimate heating step and as heating fluid may be used reaction mixture which has already passed through the subsequent and last heating step or device and which has thus been further heated.

In the last heating step, the reaction mixture is indirectly further heated by means of high pressure steam, diphenyl vapors, conventional liquid organic heat-conveying substances, a salt melt or the like.

According to the present invention, it has been found that a piston-membrane pump or a piston diaphragm pump will be suitable for conveying a suspension of bauxite in sodium aluminate lye against pressures of 150 atmospheres or the like and such pump will operate without difficulty under the prevailing operating conditions. Furthermore, it was found that the total length of the reaction tube could be relatively short, considerably shorter than would have been anticipated. This is due to several factors, one of which is that the heat transfer to and within the reaction mixture is considerably more favorable than in conventional autoclaves. While in autoclaves, depending on the degree of incrustation of the heating surface, a transfer of about 125 kcal./m.$^2$ h. ° C. could be calculated, it is possible to obtain in the reaction tube of the present invention heat transfers of the magnitude of 2,000 kcal./m.$^2$ h. ° C. Thereby, surprisingly, the total required length of the reaction tube will be reduced to only about 10% of the expected length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of an arrangement according to the present invention; and FIG. 2 is a schematic elevational view of another arrangement of the present invention which will be described in more detail in the example further below.

Referring now to the drawing and particularly to FIG. 1, it will be seen that the arrangement comprises a reaction tube 1 which, depending on the volume of bauxite suspension which is to be introduced per unit of time, and depending on the inner diameter of the reaction tube, may have a length of for instance between 300 and 1300 meters.

A bauxite suspension in aluminate lye which, due to the lye concentration of, for instance, only 140 g. Na$_2$O per liter may also contain only a relatively low concentration of bauxite suspended therein, is introduced at a temperature of, for instance, about 60° C. into reaction tube 1, by means of piston diaphragm pump 7, and, while passing through the reaction tube, the suspension is stepwise heated to the decomposition temperature of the bauxite.

In the portion of the reaction tube which lies within section A of FIG. 1, the suspension is indirectly heated by the vapors emanating from a single one, or a series, of pressure reducing devices 2. Thereby, the suspension is heated to about 200° C. For the purpose of heating the suspension in section A, portions of the reaction tube are located in casings 3 through which the heating vapors pass in contact with the outer surface of the respective portion of the reaction tube 1. Within these casings, the reaction tube is arranged as a "coiled portion" in such a manner that the length of the reaction tube portion located within the respective casing is preferably several times greater than the length of the casing. It is clearly apparent from FIG. 1 that the reduction of the pressure of the heated compressed lye containing the decomposed bauxite is carried out in several steps and that the vapors formed in the individual pressure reducing vessels are introduced into the casings of the respective heat exchange devices of section A in countercurrent sequence to the direction of flow of the bauxite suspension. In this manner, progressive heating of the suspension takes place which at the end of section A will have led to a temperature of the suspension of about 200° C.

In the next following section B, the reaction tube is surrounded by a sleeve, or is jacketed, and upon completion of heating of the reaction mixture in section C, the hot reaction mixture formed in section C is passed through the jacket of the heat exchanger portion 4 of the reaction tube to further heat the reaction mixture flowing through the reaction tube to about 260° C. While, as illustrated, in the jacketed portion 4, the reaction mixture which is to be further heated flows through the inner tube and is heated by the passage of the hot reaction mixture through the jacket, this can also be reversed so that the reaction mixture which is to be further heated flows through the jacket while the heating fluid flows through the inner tube. To pass the reaction mixture heated in section C through the inner tube of the jacketed arrangement of section B has the advantage that the heat insulation of the entire heat exchange device 4 is facilitated and that the pressure reduction at the pressure reduction valve 5 can be easier controlled. The hot reaction mixture which is used for indirectly heating reaction mixture in heat exchanger 4 by passing through the jacket or inner tube thereof, enters heat exchanger 4 at a temperature of 300° C. and leaves the same at a temperature of 240° C., while the thereby heated reaction mixture leaves heat exchanger 4 at 260° C. and at about that temperature is introduced into heat exchanger 6 or section C.

In section C, reaction tube 1 is surrounded by a jacket 6, and thus this portion of the arrangement is again function as a heat exchanger while passing high pressure steam, hot diphenyl vapors, a suitable liquid organic heat conveying substance or a salt melt through jacket 6. However, if heat exchanger arrangement 6 is operated with high pressure steam as the heating fluid, it is preferable to construct heat exchanger 6 similar to heat exchanger 3, namely so that a coiled portion of reaction tube 1 passes through a casing in which the high pressure steam will contact the outer face of the coiled or otherwise meandering portion of reaction tube 1.

The condensate formed of the high pressure steam upon passage through heat exchanger 6, is then introduced into the last one of the pressure reducing vessels of section A. The condensate formed in this last pressure reducing vessel may then be introduced into a power station for reconversion into steam, while the condensate formed of the vapors which were used as heating fluid in the heat exchangers of section A will be introduced into and utilized in the red mud washer. The aluminum oxide-containing lye from the last of the pressure reducing vessels 2 is passed to a thickener, if desired together with thin aluminate lye and the lye obtained upon washing of the red mud.

In section C, the reaction mixture is heated to the desired final temperature of for instance 300° C. and thereby decomposition of the bauxite is completed. As described, the thus obtained hot solution in which red mud will be suspended is introduced as heating fluid into section B and will leave heat exchanger 4 at a temperature of about 240° C. The still pressurized liquid passes then through pressure reducing valve 5 into a single one, or series of pressure reducing vessels 2 and from there for the purpose of separation of red mud into a thickener (not shown).

The dividing lines between sections A and B may be moved and, in an extreme case, the preheating according to section A may be dispensed with. For instance, if it is not desired to recover condensate from the aluminate lye which is used for decomposition of the bauxite, then the entire heat exchange may be carried out in jacketed tubular heat exchangers such as the one shown in section B.

It has been found that by proceeding in accordance with the present invention, the residence time required for decomposition of the bauxite can be greatly reduced, in fact, to the relatively short time of only a few minutes which is required for the passage of the reaction mixture through reaction tube 1. The decomposition of the bauxite is completed without requiring any holding time of the reaction mixture at the finally reached temperature of, for instance, about 300° C. The maximum end temperature which must be reached in heat exchanger 6 varies dependent on the type of bauxite, and in the case of Greek bauxite which is very difficult to decompose, the maximum temperature will be at or above 300° C.

It follows that by operating under conditions which correspond to that of the conventional autoclave decomposition of bauxite, the reaction time and thus the residence time, or the entire time required for passage of the reaction mixture through the tube, may be considerably reduced. This will result in a considerable reduction of the length of the reaction tube and of the operative volume of the entire arrangement.

While in the conventional autoclave decomposition of bauxite about 4 m.$^3$ of apparatus volume are required for reacting one cubic meter of bauxite suspension per hour, the arrangement of the present invention which utilizes a reaction tube, will require a tube of only 0.1 m.$^3$ inner volume for reacting 1 cubic meter of bauxite suspension per hour. Thus, a reaction tube which has a volume of less than 2 m.$^3$ or preferably about 0.1 m.$^3$ for each cubic meter of bauxite suspension which is to be reacted per hour, will be advantageously used in accordance with the present invention.

It is particularly advantageous to use as heat exchangers portions of the reaction tube which are covered by a jacket through which the heating fluid flows. However, different heat exchangers such as those which were described in connection with section A of FIG. 1, or conventional tubular heat exchangers containing a plurality of parallel tubes may be used, as long as it is assured that no plugging up will occur.

It has then been found, in accordance with the present invention, that the incrustations at the heat exchange surface exposed to the flow of reaction mixture can be avoided to a very large extent if the speed of flow of the bauxite suspension will be more than 1 meter per second, and preferably between about 2.5 and 5 meters per second. Any incrustations which are still formed will be rubbed off by the abrasive effect of the fast flowing bauxite suspension.

Furthermore, certain difficulties expected during the reduction of the pressure of the hot lye leaving the reaction tube 1, can be overcome in accordance with the present invention by utilizing for the heat exchange during the cooling a tube which has a relatively very small diameter so that a very considerable pressure reduction will take place. Preferably, this tube is so formed that the dynamic pressure loss corresponds to the pressure loss caused by the temperature drop. The pressure reduction is then preferably carried out in an elongated tubular nozzle having a length of several meters and preferably constructed as a double nozzle, i.e. so that two tubular nozzles are arranged adjacent each other with suitable devices for switching the flow of reaction mixture from one to the other nozzle. The inner diameter of the tubular nozzle will become smaller in the direction of flow of the lye.

Furthermore, high decomposition temperatures such as 300° C., as indicated in FIG. 1, make is possible to then pass the lye through a series of pressure reducing vessels indicated in FIG. 1 by reference numeral 2, so that an amount of condensation water equal to about 3 m.$^3$ per ton of aluminum oxide will be recovered, while up to now at most about 2 m.$^3$ of condensation water were recovered per ton of aluminum oxide. The thus recovered amount of water, namely 3 m.$^3$ per ton of aluminum oxide, suffices in the operation of modern continuous red mud filters for the washing of the red mud. Thus, a special evaporation arrangement will not be required. The use of a relatively thin initial aluminate lye alone would not be enough to dispense with the evaporation device, since it is always necessary to provide the required amount of water for the washing of the mud.

If, for whatever reasons, it is undesirable to include a series of pressure reducing vessels in the arrangement, then it is possible, by using jacketed tubular heat exchangers or the like to directly recover the heat of the lye leaving heat exchanger 6, so that total heat consumption of the arrangement is reduced to a minimum.

The arrangement of the present invention can be advantageously used not only for working up European bauxites, but also for the working up of tropical bauxites which may be decomposed at lower temperatures. In the latter case, the difficulties with respect to the structure of the apparatus are not so much connected with the heat exchange but with the requirement to suspend in the lye, and to maintain in suspension, relatively coarse bauxite constituents. This, in general requires intensive stirring and more complicated design of the decomposition apparatus in order to prevent sedimentation. However, the reaction tube according to the present invention will keep even coarse bauxite particles in suspension provided that within the reaction tube a turbulent flow is maintained.

The reduction of the pressure of the lye leaving heat exchange 3 can be carried out, as described above, in pressure reduction vessels from which vapors are withdrawn and used as heating fluid during the first of successive series of heating steps to which suspension flowing through reaction tube 1 is exposed. Preferably several pressure reduction vessels are arranged in series and the pressure of the liquid is consecutively reduced therein. On the other hand, the pressure reduction may also be achieved, at least partly, by frictional contact with the inner face of the conduit through which the hot lye passes.

This is accomplished in heat exchanger 4 through which the hot lye from heat exchanger 6 passes either through the jacket or through the inner tube thereof, by so dimensioning the jacket or the inner tube, i.e. the space through which the lye serving as heating fluid passes, that the frictional flow resistance is about equal to the pressure loss required for the desired degree of pressure reduction.

It is important to prevent vapor formation in the flowing lye since vapor formation would cause a greatly accelerated flow and consequently undesirable wear of the tubular walls and, for this reason, the pressure reduction should not go so far as to reach the pressure of saturated steam at the prevailing temperature.

As a further pressure reducing device, a relatively long tubular nozzle is proposed which should have a length of at least about 1 meter and preferably will be constructed as a double nozzle so that alternately the lye can flow through one or the other of the nozzles. Preferably, the nozzle will have a length of several meters, such as about 8 meters, and a relatively large inner diameter at the inlet opening of the nozzle and a smaller inner diameter at the outpet opening of the nozzle. By providing two nozzles which may be alternately placed in operative connection, it is possible to replace one of the nozzles without interfering with the continuous operation of the arrangement.

It has been pointed out further above that turbulent flow of the reaction mixture through reaction tube 1 is desired in order to destroy any incrustations at the inner face of reaction tube 1. Such turbulence is automatically achieved by the relatively high speed of flow of the reaction mixture through reaction tube 1.

The process and apparatus of the present invention will now be described, by way of example, with reference to FIG. 2, without, however, limiting the invention to the specific details of the example or of the arrangement illustrated in FIG. 2.

It will be seen in FIG. 2 that the reaction mixture is introduced through a piston diaphragm pump 10 capable of pumping 80 cubic meters per hour of the bauxite suspension at an operating pressure of about 150 atmospheres.

The reaction tube 11 has an inner diameter of 111 mm., an outer diameter of 133 mm. and a wall thickness of 11 mm.

The U-shaped heat exchanger portion 13 of reaction tube 11 may be shaped as described in connection with section A of FIG. 1, in other words, the length of the reaction tube portion of heat exchanger 13 will be several times the length of the casing surrounding this heat exchanger portion.

In the present case, the length of the reaction tube within heat exchanger 13 is 210 meters, arranged in windings and corresponding to a heating surface of 80 m.$^2$. Each leg of the U-shaped casing has a length of 30 meters and the inner diameter of the casing is 450 mm. The reaction tube emanating from the casing of heat exchanger 13 will then form part of heat exchanger 14 by being jacketed for a length of 552 meters. The inner diameter of the outer tube or jacket of heat exchange 14 is 161.8 mm., the outer diameter of the jacket is 193.8 mm. and the wall thickness 16.0 mm. The distance between the inner tube or the reaction tube 11 and the jacket of heat exchanger 14 is 14.4 mm.

The reaction tube 11 then passes through the U-shaped heat exchanger 16 into which are introduced 14 tons per hour of high pressure steam having a gauge pressure of 85 atmospheres and a temperature of 310° C. The length of reaction tube 11 within heat exchanger 16 is 305 meters arranged in three windings and corresponding to a heating surface of 117 m.$^2$. Each leg of the U-shaped casing of the heat exchanger arrangement 16 has a length of 50 meters, and the inner diameter of the casing is 450 mm.

The flow of the reaction suspension and/or solution is indicated by arrows and it will be seen that after being heated to a final highest temperature in heat exchanger 16, the hot lye containing the dissolved aluminum oxide will pass through the jacket of heat exchanger 14 and from there through elongated tubular nozzle 15 having a length of 8.5 meters and an inner diameter of 111 mm. at the inlet opening thereof and of 20 mm. at the outlet opening thereof.

From the outlet opening of elongated tubular nozzle 15, the lye passes through several pressure reducing vessels 12 arranged in series and each having a height of about 5 meters and an inner diameter of about 3 meters, in which the pressure is stepwise reduced to 10, 6, 3 and 1.2 atmospheres gauge pressure.

At the inlet of heat exchanger arrangement 13, the reaction mixture will have a temperature of 70° C. and a gauge pressure of 100 atmospheres. Upon leaving heat exchanger arrangement 13, the reaction mixture has a temperature of 120° C. and a gauge pressure of 97 atmospheres. Upon entering heat exchanger arrangement 16, the temperature of the reaction mixture is 240° C. and the gauge pressure 90 atmospheres. Upon leaving heat exchanger arrangement 16, the temperature is 290° C. at a gauge pressure of 85 atmospheres. The reaction mixture enters elongated nozzle 15 at a temperature of 165° C. and a gauge pressure of 51 atmospheres. At the inlet of the pressure reducing vessels, the temperature of the reaction mixture is 165° C. and the gauge pressure 16 atmospheres, and upon leaving the series of pressure reducing vessels 12, the reaction mixture is passed to the thickener for separation of the red mud at a temperature of 110° C. and a gauge pressure of 1.2 atmospheres.

What is claimed as new and desired to be secured by Letters Patent is:

1. A method of recovering aluminum oxide from bauxite, comprising the steps of forming a suspension of bauxite in aluminate lye; passing said suspension at superatmospheric pressure and with a speed greater than one meter per second through an indirectly heated reaction tube so as to heat said suspension during passage through said reaction tube in successive heating steps to a temperature sufficiently high to substantially dissolve the aluminum oxide of said bauxite in said aluminate lye thereby forming under pressure a hot suspension of residual constituents of said bauxite in insoluble form, said superatmospheric pressure being sufficiently high to prevent steam bubble formation in said hot suspension; cooling said hot suspension under recovery of heat therefrom; utilizing the thus recovered heat for providing the heat for the initial heating steps; and recovering aluminum oxide from the solute of the thus formed cooled suspension.

2. A method of recovering aluminum oxide from bauxite, comprising the steps of forming a suspension of bauxite in aluminate lye; passing said suspension at superatmospheric pressure and with a speed greater than one meter per second through an indirectly heated reaction tube so as to heat said suspension during passage through said reaction tube in successive heating steps to a temperature sufficiently high to substantially dissolve the aluminum oxide of said bauxite in said aluminate lye thereby forming under pressure a hot suspension of residual constituents of said bauxite in insoluble form, said superatmospheric pressure being sufficiently high to prevent steam bubble formation in said hot suspension; cooling said hot suspension and recovering aluminum oxide from the solute of the thus formed cooled suspension.

3. A method of recovering aluminum oxide from bauxite as defined in claim 2, wherein said suspension is passed through said heated reaction tube at a speed of flow of between about 2.5 and 5.0 meters per second.

4. A method of recovering aluminum oxide from bauxite as defined in claim 2, wherein the speed of flow of said suspension through said reaction tube is so chosen that the time required for said suspension to pass from the inlet of said reaction tube to the outlet thereof will be less than 10 minutes.

5. A method of recovering aluminum oxide from bauxite as defined in claim 2, wherein said suspension is heated during passage through said reaction tube to a temperature of about 250° C., and said hot solution is cooled to a temperature of about 100° C.

6. A method of recovering aluminum oxide from bauxite as defined in claim 2, wherein said hot solution is cooled by reducing the pressure thereof so as to withdraw steam therefrom due to said pressure; and wherein the thus formed steam is utilized for said providing of heat for the initial heating steps.

7. A method of recovering aluminum oxide from bauxite as defined in claim 6, wherein said reducing of the pressure of said hot solution is carried out so as to withdraw therefrom about 3 tons of steam per ton of recovered aluminum oxide.

8. A method of recovering aluminum oxide from bauxite as defined in claim 2, wherein said cooling of said hot solution is at least partially carried out by subjecting said hot solution to indirect heat exchange.

9. A method of recovering aluminum oxide from bauxite as defined in claim 2, wherein said cooling of said hot solution is partly carried out by reducing the pressure of said solution under formation of steam, and partly by subjecting the solution to indirect heat exchange.

10. A method of recovering aluminum oxide from bauxite as defined in claim 2, wherein said heating of said suspension in successive heating steps comprises three heating steps so that said solution is heated in a first heating step to about 200° C., in a second heating step to about 260° C., and in a third heating step to a final temperature of the hot solution of about 300° C.

11. A method of recovering aluminum oxide from bauxite as defined in claim 2, wherein the volume of suspension located at any given time in said reaction tube equals between 2 times and one-tenth of the hourly volume of suspension passing through said reaction tube.

References Cited

UNITED STATES PATENTS

| | | | |
|---|---|---|---|
| 2,056,993 | 10/1936 | Weigel | 23—143 |
| 2,107,919 | 2/1938 | Turner et al. | 23—52 |
| 3,095,280 | 6/1963 | Soudan et al. | 23—143 X |
| 3,112,994 | 12/1963 | Donaldson | 23—143 |
| 3,241,910 | 3/1966 | Johnson | 23—52 |

OSCAR R. VERTIZ, Primary Examiner

G. T. OZAKI, Assistant Examiner

U.S. Cl. X.R.

23—52, 260, 285